United States Patent
Leroy et al.

(10) Patent No.: US 9,422,875 B2
(45) Date of Patent: Aug. 23, 2016

(54) METHOD OF CONTROLLING THE BURNT GAS FRACTION IN AN ENGINE CYLINDER WITH EGR AND IGR

(71) Applicant: IFP Energies nouvelles, Rueil-Malmaison Cedex (FR)

(72) Inventors: Thomas Leroy, Saint Germain en Laye (FR); Jonathan Chauvin, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 895 days.

(21) Appl. No.: 13/672,752

(22) Filed: Nov. 9, 2012

(65) Prior Publication Data
US 2013/0131964 A1    May 23, 2013

(30) Foreign Application Priority Data
Nov. 17, 2011 (FR) .................................... 11 03501

(51) Int. Cl.
| | | |
|---|---|---|
| *F02D 41/00* | (2006.01) | |
| *F02D 41/10* | (2006.01) | |
| *F02D 41/24* | (2006.01) | |
| *F02D 13/02* | (2006.01) | |
| *F02B 29/04* | (2006.01) | |

(52) U.S. Cl.
CPC ........ *F02D 41/0002* (2013.01); *F02D 13/0215* (2013.01); *F02D 41/0055* (2013.01);
(Continued)

(58) Field of Classification Search
CPC .......... F02D 13/0215; F02D 2041/001; F02D 2200/0402; F02D 2200/0406; F02D 2200/0414; F02D 2200/101; F02D 2250/18; F02D 41/0002; F02D 41/0007; F02D 41/0062; F02D 41/107; F02D 41/2409; F02M 25/0709

USPC .............. 701/103, 105, 108, 110; 123/90.15, 123/90.16, 568.14–568.16, 568.21, 123/345–348; 73/114.31–114.33, 114.37; 60/602, 605.2
See application file for complete search history.

(56) References Cited

U.S. PATENT DOCUMENTS

| | | | | |
|---|---|---|---|---|
| 5,205,260 A | * | 4/1993 | Takahashi | ........... F02D 41/0072 |
| | | | | 123/492 |
| 5,778,857 A | * | 7/1998 | Nakamura | ............ F02D 35/023 |
| | | | | 123/406.29 |

(Continued)

FOREIGN PATENT DOCUMENTS

EP          2 211 043 A1     7/2010

OTHER PUBLICATIONS

Leroy, T., et al: "Modeling Fresh Air Charge and Residual Gas Fraction on a Dual Independent Variable Valve Timing SI Engine", SAE Int. J. Engines, vol. 1, No. 1, Apr. 14, 2008, pp. 627-635, XP002682108, DOI: 10.4271/2008-01-0983.

*Primary Examiner* — Erick Solis
*Assistant Examiner* — Carl Staubach
(74) *Attorney, Agent, or Firm* — Fitch, Even, Tabin & Flannery LLP

(57) ABSTRACT

The invention relates to a method of controlling an internal-combustion engine (1) equipped with an exhaust gas recirculation circuit and with variable timing means, having a first actuator (8) and of a second actuator (9). The method comprises acquiring a torque setpoint for the engine $T_q^{sp}$ determining a position setpoint for the first actuator (8) $\overline{VVT}_{int}$ and a position setpoint for the second actuator (9) $\overline{VVT}_{exh}$ by using a burnt gas flow model (MEGB) that relates the position setpoints of the actuators to the engine torque setpoint $T_q^{sp}$. The burnt gas flow model (MEGB) comprises a cylinder filling model (MR), the burnt gas fraction in the cylinder is controlled by applying position setpoints $\overline{VVT}_{int}$ and $\overline{VVT}_{exh}$ to the variable timing means (8 and 9).

12 Claims, 4 Drawing Sheets

(52) U.S. Cl.
CPC .......... *F02D41/0062* (2013.01); *F02D 41/107* (2013.01); *F02D 41/2409* (2013.01); *F02B 29/0406* (2013.01); *F02D 41/0007* (2013.01); *F02D 2041/001* (2013.01); *F02D 2200/0402* (2013.01); *F02D 2200/0406* (2013.01); *F02D 2200/0414* (2013.01); *F02D 2200/101* (2013.01); *F02D 2250/18* (2013.01); *F02M 26/48* (2016.02); *Y02T 10/18* (2013.01); *Y02T 10/42* (2013.01); *Y02T 10/47* (2013.01)

(56) References Cited

U.S. PATENT DOCUMENTS

| | | | | |
|---|---|---|---|---|
| 6,742,335 B2* | 6/2004 | Beck | ...... | F01N 3/021 123/568.11 |
| 7,848,872 B2* | 12/2010 | Ma | ...... | F02D 41/0072 123/568.21 |
| 8,307,814 B2* | 11/2012 | Leroy | ...... | F02D 41/0002 123/568.14 |
| 9,109,522 B2* | 8/2015 | Bresch-Pietri | ...... | F02D 41/1448 |
| 2001/0011541 A1* | 8/2001 | Kawasaki | ...... | F01L 9/04 123/568.14 |
| 2004/0015287 A1 | 1/2004 | Ilzuka et al. | | |
| 2004/0144082 A1* | 7/2004 | Mianzo | ...... | F02D 13/0215 60/285 |
| 2009/0164105 A1* | 6/2009 | Ma | ...... | F02D 41/0072 701/108 |
| 2010/0180876 A1* | 7/2010 | Leroy | ...... | F02D 41/0002 123/704 |
| 2012/0031384 A1* | 2/2012 | Haskara | ...... | F02D 35/023 123/703 |
| 2013/0096806 A1* | 4/2013 | Bresch-Pietri | ...... | F02D 41/1448 701/108 |
| 2013/0131956 A1* | 5/2013 | Thibault | ...... | F02D 45/00 701/102 |

* cited by examiner

METHOD OF CONTROLLING THE BURNT GAS FRACTION IN AN ENGINE CYLINDER WITH EGR AND IGR

CROSS REFERENCE TO RELATED APPLICATION

Reference is made to French Patent Application No. FR 11/03.501, filed on Nov. 17, 2011, which application is incorporated herein by reference in its entirety.

BACKGROUND OF THE INVENTION

1. Field of the Invention

The present invention relates to engine control and more particularly to a part of the air system control of a gasoline engine equipped with variable timing of VVT type (Variable Valve Timing) and with an external recirculation circuit for the low-pressure exhaust gas (EGR). Variable timing is a technology allowing several parameters to be varied in a combustion engine, notably timing, opening time and/or lift of the intake and exhaust valves.

2. Description of the Prior Art

In a gasoline engine, the amount of burnt gas present in the cylinders upon closure of the intake valve is obtained in two ways which are through internal burnt gas recirculation (IGR) via the intake and exhaust valve actuators, which are the variable timing means referred to as VVT actuators, and through external recirculation via the EGR circuit.

In fact, variable timing allows achieving internal recycling of the burnt gas by controlling opening and closing of the intake and exhaust valves. The exhaust gas flows back from the exhaust line to the intake line when the intake and exhaust valves are simultaneously open. The duration and the amplitude of the simultaneous valve opening is, in the case of internal gas recirculation, decisive for the amount of gas recycled. In this case, variable timing means make it possible for at least one intake valve to be controlled so as to be open before the piston top dead center in the cylinder, while at least one exhaust valve is controlled so as to be closed just before this piston top dead center. Both valves are then opened at the same time and the exhaust gas is recycled. The advantages of internal gas recycling as opposed to external recycling are the fast reaction of the system and good distribution of the recycled gas.

These two burnt gas sources have very distinct response times. Indeed, IGR is controlled through the phase shift of the valves, which is very fast. On the other hand, EGR control is very slow because the burnt gas flow time in the exhaust gas recirculation circuit is long, due to the length of this circuit. It seems pertinent to control the fast quantity (IGR via the VVT actuators) under transient conditions so as to make up for the EGR slowness (via the EGR valve). Indeed, for transient conditions, a fast response time is necessary.

A typical example of transient conditions is easing off the gas pedal under high load. At the start of the transient state, the EGR rate is high. In fact, the EGR rate is high under high load so as to push back the limits of engine knock. At the end of the transient state, under partial load, the rate is zero whereas the IGR rate increases. Indeed, the IGR rate is high under partial load due to the valve overlap with a view to decreasing engine pumping losses. However, under transient conditions, the amount of EGR entering the cylinders is not zero since burnt gas is present throughout the intake line. There is therefore a high risk of having too large an amount of burnt gas in the chamber (EGR plus IGR) and thus engine flameout. The goal, in this case of transient state, is then to limit as much as possible the amount of IGR until the intake line is emptied of the burnt gas it contains.

FIG. 3 shows the setpoint determination scheme for the air loop (10) of a gasoline engine with EGR and IGR according to the prior art. From an engine torque setpoint $T_q^{sp}$ and the engine speed measurement $N_e$, engine maps (MAP) allow defining the setpoints relative to the sucked air mass setpoint $m_{air}^{sp}$, the burnt gas fraction in the intake manifold $X_{int}^{sp}$, positions of the intake and exhaust valve actuators $VVT_{int}^{sp}$ and $VVT_{exh}^{sp}$ for the steady state which are sought for the engine torque setpoint $T_q^{sp}$. The air mass setpoint $m_{air}^{sp}$ is then modified into a sucked mass setpoint $m_{asp}^{sp}$ using a value of the burnt gas fraction in the intake manifold $X_{int}$. This burnt gas fraction in the intake manifold can be obtained by any means, notably an estimation method or a measurement method. From the intake mass setpoint $m_{asp}^{sp}$ and from the measurement of the position of actuators (8 and 9) of the exhaust (13) and intake (12) valves, $VVT_{exh}$ and $VVT_{int}$, a filling model (MR) allows giving a pressure setpoint in the intake manifold $P_{int}^{sp}$.

Controllers (15) allow controlling the intake pressure, the EGR and variable timing means (8 and 9) to guarantee the pressure setpoint $P_{int}^{sp}$, the burnt gas fraction setpoint in the intake manifold $X_{int}^{sp}$ and the positions of the intake and exhaust valve actuators $VVT_{int}^{sp}$ and $VVT_{exh}^{sp}$ of the steady state.

The method described in FIG. 3 thus does not allow controlling the burnt gas fraction in the cylinder under transient conditions.

SUMMARY OF THE INVENTION

The engine control method according to the invention allows controlling the burnt gas fraction in the cylinder with a combination of EGR and of IGR by optimizing this burnt gas fraction in the cylinder under transient conditions. The method according to the invention is based on the control of actuators of the intake and exhaust valves using a burnt gas flow model based on a cylinder filling model. This method requires no calibration, except the use of a cylinder filling model estimating the sucked mass in the cylinders and the burnt gas mass.

The invention relates to a method of controlling an internal-combustion engine comprising at least one cylinder, at least one intake valve in the cylinder and at least one exhaust valve for burnt gas discharge from the cylinder, with the engine being equipped with an exhaust gas recirculation circuit and variable timing means, the variable timing means having a first actuator of the intake valve and of a second actuator of the exhaust valve. The method comprises the following:

acquiring a torque setpoint for said engine $T_q^{sp}$;

determining a position setpoint for the first actuator $\overline{VVT}_{int}$ and a position setpoint for the second actuator $\overline{VVT}_{exh}$ by using a burnt gas flow model (MEGB) relating position setpoints of the actuators to the engine torque setpoint $T_q^{sp}$, the burnt gas flow model (MEGB) comprising a cylinder filling model (MR); and controlling the burnt gas fraction in the cylinder by applying position setpoints $\overline{VVT}_{int}$ and $\overline{VVT}_{exh}$ to the variable timing means.

Advantageously, the filling model (MR) is a static cylinder filling model estimating the intake air mass and the burnt gas mass in the cylinder as a function of engine speed $N_e$, temperature $T_{int}$ and pressure $P_{int}$ in the intake manifold, and the positions of the actuators $VVT_{exh}$ and $VVT_{int}$.

According to an embodiment, the burnt gas flow model (MEGB) is constructed using engine maps (MAP) as a function of the torque setpoint $T_q^{sp}$ of the engine associated with the filling model (MR) of the cylinder.

The filling model (MR) of the cylinder can be expressed by the equation as follows:

$$X_{cyl} = \Phi(P_{int}, X_{int}, VVT_{int}, VVT_{exh})$$

with:
- $X_{cyl}$ being the burnt gas mass fraction in the cylinder,
- $P_{int}$ being pressure in an intake manifold, integrated in the engine upstream from the cylinder, where the mixture of air and burnt gas is withdrawn for the intake,
- $X_{int}$ being a burnt gas mass fraction in the intake manifold,
- $VVT_{int}$ being a position of the first actuator, and
- $VVT_{exh}$ being a position of the second actuator.

Preferably, the filling model (MR) is obtained from the following equations:

$$\begin{cases} m_{asp}^{int} = f(P_{int}, VVT_{int}, VVT_{exh}) \\ m_{asp}^{exh} = g(P_{int}, VVT_{int}, VVT_{exh}) \end{cases}$$

wherein:

$$\begin{cases} f(P_{int}, VVT_{int}, VVT_{exh}) = \alpha_1(P_{int}, N_e)\frac{P_{int}}{RT_{int}}V_{ivc}(VVT_{int}) - \\ \alpha_2(P_{int}, N_e)\frac{OF(VVT_{int}, VVT_{exh})}{N_e} - \alpha_3(P_{int}, N_e)V_{evc}(VVT_{exh}) \\ g(P_{int}, VVT_{int}, VVT_{exh}) = \alpha_2(P_{int}, N_e)\frac{OF(VVT_{int}, VVT_{exh})}{N_e} + \\ \alpha_3(P_{int}, N_e)V_{evc}(VVT_{exh}) \end{cases}$$

and from the equation:

$$X_{cyl} = \frac{X_{int}m_{asp}^{int} + m_{asp}^{exh}}{m_{asp}^{int} + m_{asp}^{exh}}$$

with:
- $X_{cyl}$ being a burnt gas mass fraction in the cylinder,
- $P_{int}$ being pressure in the intake manifold,
- $X_{int}$ being a burnt gas mass fraction in the intake manifold,
- $m_{asp}^{int}$ being a mass sucked in the cylinders through the intake valves,
- $m_{asp}^{exh}$ being a sucked mass from the IGR,
- $\alpha_1, \alpha_2$ and $\alpha_3$ being known filling model calibration parameters as a function of $P_{int}$ and $N_e$,
- $V_{ivc}$ being cylinder volume at ivc (intake valve closure) as a function of the position of the actuator of at least one intake valve $VVT_{int}$,
- $V_{evc}$ being cylinder volume at evc (exhaust valve closure) as a function of the position of the second actuator $VVT_{exh}$,
- OF being an overlap factor as a function of the positions of the actuators of the intake and exhaust valves, $VVT_{int}$ and $VVT_{exh}$.

According to an embodiment, the burnt gas flow model (MEGB) is constructed by carrying out the following:

a) determining setpoints relative to the pressure in the intake manifold $P_{int}^{sp}$, the burnt gas fraction in the intake manifold $X_{int}^{sp}$ and a position of the variable timing means $VVT_{int}^{sp}$ and $VVT_{exh}^{sp}$ desired in the steady state as a function of the engine torque setpoint $T_q^{sp}$;

b) determining a setpoint for the burnt gas fraction in the cylinder $X_{cyl}^{sp}$ by applying the cylinder filling model (MR) from the intake pressure setpoint $P_{int}^{sp}$, the burnt gas fraction setpoint in the intake manifold $X_{int}^{sp}$ and position setpoints for said actuators $VVT_{int}^{sp}$ and $VVT_{exh}^{sp}$ of the steady state; and c) determining the position setpoints for the actuators $\overline{VVT}_{int}$ and $\overline{VVT}_{exh}$ by inverting the cylinder filling model (MR) from the estimated burnt gas fraction in the intake manifold $X_{int}$, the burnt gas fraction setpoint in the cylinder $X_{cyl}^{sp}$ and the estimated pressure in the intake manifold $P_{int}$.

Advantageously, the setpoints relative to the pressure in the intake manifold $P_{int}^{sp}$, the burnt gas fraction in the intake manifold $X_{int}^{sp}$ and the position of the variable timing means $VVT_{int}^{sp}$ and $VVT_{exh}^{sp}$ desired in the steady state are obtained by carrying out the following:

i) determining an air mass setpoint in the cylinder $m_{air}^{sp}$, a burnt gas fraction setpoint in the intake manifold $X_{int}^{sp}$ and position setpoints for the intake and exhaust valve actuators $VVT_{int}^{sp}$ and $VVT_{exh}^{sp}$ desired in the steady state from maps (MAP) of the engine, the maps (MAP) depending on the engine speed $N_e$ and on the engine torque setpoint $T_q^{sp}$;

ii) determining an intake air mass setpoint in the cylinder $m_{asp}^{sp}$ from the estimation of the burnt gas fraction in the intake manifold $X_{int}$ and of the air mass in the cylinder $m_{air}^{sp}$ by a method of estimating or a method of measuring the burnt gas fraction in the intake manifold; and iii) determining an intake pressure setpoint $P_{int}^{sp}$ by the inverted cylinder filling model (IMR) from the intake air mass setpoint in the cylinder $m_{asp}^{sp}$ and the estimated positions of the intake and exhaust valve actuators $VVT_{int}$ and $VVT_{exh}$.

Preferably, determination of the position setpoints of the actuators $\overline{VVT}_{int}$ and $\overline{VVT}_{exh}$ is obtained by carrying out the following:

i) setting the position of the second actuator $VVT_{exh}$ to its setpoint value $VVT_{exh}^{sp}$ in the steady state;

ii) determining the position setpoint of the first actuator $\overline{VVT}_{int}$ from a position setpoint of the second actuator $VVT_{exh}$ by applying the inverted cylinder filling model (IMR):

$$\overline{VVT}_{int} = \Phi(X_{cyl}^{sp}, P_{int}, VVT_{exh}^{sp})$$

iii) determining the position setpoint of the second actuator $\overline{VVT}_{exh}$ so that if the position setpoint of the first actuator $\overline{VVT}_{int}$ enters saturation, the position setpoint of the second actuator is determined from the position of the first actuator $\overline{VVT}_{int}$ using the inverted cylinder filling model (IMR):

$$\overline{VVT}_{exh} = \Phi(X_{cyl}^{sp}, P_{int}, X_{int}, \overline{VVT}_{int})$$

and otherwise, the position of the second actuator is determined as its setpoint value $VVT_{exh}^{sp}$ in the steady state with $\overline{VVT}_{exh} = VVT_{exh}^{sp}$.

Furthermore, the invention relates to an internal-combustion engine comprising at least one cylinder, at least one intake valve in the cylinder and at least one exhaust valve for burnt gas discharge from the cylinder, the combustion engine being equipped with a burnt gas recirculation circuit and with variable timing means, the variable timing means having a first actuator with at least one intake valve and of a second actuator having at least one exhaust valve. The engine comprises control means for the engine, suited for application of the control method according to the invention.

The invention also relates to a vehicle, notably a motor vehicle, comprising an internal-combustion engine as described above.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE EMBODIMENTS

Figure 1:
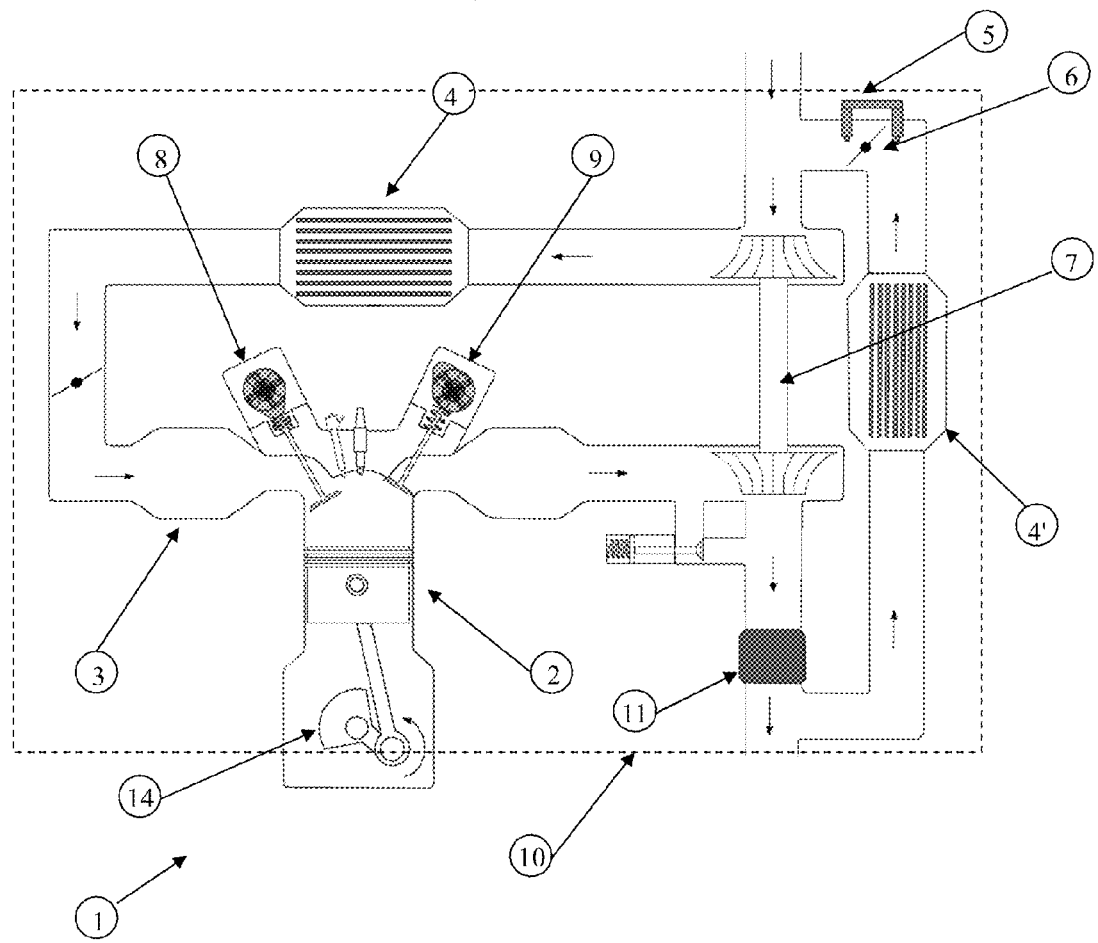
FIG. 1 illustrates an embodiment of an engine equipped with an EGR circuit and variable timing means.

FIG. 1 shows an embodiment of a gasoline engine (1) equipped with a burnt gas recirculation circuit EGR and with variable timing means. For this embodiment, it is a low-pressure EGR circuit. At least one cylinder (2) of combustion engine (1) is supplied with air and burnt gas from an intake manifold (3). The air intake circuit is equipped with a cooler (4) and a compressor of a turbocharger (7). The exhaust line has an exhaust manifold, a turbine of turbocharger (7) and a bypass line for injecting part of the burnt gas into the air intake circuit. The burnt gas recirculation circuit withdraws burnt gas from the engine exhaust at the outlet of a catalyst (11) downstream from the turbine of turbocharger (7) and reinjects it into the intake of a cylinder (2) upstream from the compressor of turbocharger (7). This part of the circuit is notably equipped with a cooler (4') and with a controlled valve, referred to as EGR valve (6). Furthermore, the engine shown in FIG. 1 is provided with a detector (5), in a vicinity of the EGR valve, for determining the amount of burnt gas injected through the EGR circuit. It can be a flowmeter or a pressure detector and it is also equipped with a direct injection device. The latter three elements described, present in the embodiment of FIG. 1, are usually present on a downsized engine (whose capacity is reduced) but their presence is not directly involved in the method according to the invention.

The engine is equipped with variable timing means having two actuators (partly shown) (8 and 9) for the intake (12) and exhaust (13) valves. Actuators (8 and 9) can be controlled to drive the opening and closure of the intake (12) and exhaust (13) valves. it is possible to control the burnt gas fraction in the cylinders. The actuator can come as vane-type phasers coupled with camshafts allowing motion of the valves.

The control method according to the invention allows controlling the burnt gas fraction in a cylinder (2) of a combustion engine (1). It is based on the control of actuators (8 and 9) of the intake (12) and exhaust (13) valves. The method according to the invention comprises the following:

acquiring a torque setpoint for said engine $T_q^{sp}$; and determining a position setpoint for the first actuator (8) of at least one intake valve (12) $\overline{VVT}_{int}$ and a position setpoint for the second actuator (9) of at least one exhaust valve (13) $\overline{VVT}_{exh}$ by using a burnt gas flow model (MEGB) that relates the position setpoints of actuators (8 and 9) of the intake (12) and exhaust (13) valves to the engine torque setpoint $T_q^{sp}$, the burnt gas flow model (MEGB) comprising a cylinder filling model (MR); and controlling the burnt gas fraction in the cylinder by applying position setpoints $\overline{VVT}_{int}$ and $\overline{VVT}_{exh}$ to the variable timing means.

Notations

In the description, the terms upstream and downstream are defined with respect to the direction of flow of the gas in air loop (10). Furthermore, the following notations are used:

Engine Parameters $P_{int}$, $T_{int}$ $P_{int}$ and $T_{int}$ are pressure and temperature in intake manifold (3). These two quantities are measured.

$VVT_{adm}$ is the position of first actuator (8) of intake valves (12). It corresponds to a phase shift, in degree, with respect to a reference position.

$VVT_{exh}$ is the position of second actuator (9) of exhaust valves (13). It corresponds to a phase shift, in degree, with respect to a reference position.

$T_q$ is the engine torque.

$N_e$ is the engine speed (measured).

Variables of the Burnt Gas Circulation Model $X_{int}$ is the burnt gas fraction in intake manifold (3). The burnt gas comes from the external exhaust gas recirculation circuit (EGR)

$X_{cyl}$ is the burnt gas fraction in the cylinder. The burnt gas comes from the EGR circuit and from the internal recirculation (IGR) due to the variable timing.

$m_{asp}^{int}$ is the intake mass in the cylinders through intake valves (12). This mass is made up of fresh air and burnt gas (if the EGR valve is open).

$m_{asp}^{exh}$ is the intake mass coming from the IGR. This mass is made up of burnt gas only, due to the stoichiometric operation of the engine.

$m_{air}$ is the air mass intake in the cylinder, $m_{air} = m_{asp}^{int} + m_{asp}^{exh}$.

$\alpha_1$, $\alpha_2$ and $\alpha_3$ are known calibration parameters of the filling model as a function of $P_{int}$ and $N_e$, which are determined experimentally on the engine test bench.

$V_{ivc}$ is the cylinder volume at ivc (intake valve closure) as a function of the position of first actuator (8), $VVT_{int}$.

$V_{evc}$ is the cylinder volume at evc (exhaust valve closure) as a function of the position of second actuator (9), $VVT_{exh}$.

OF is the overlap factor as a function of the positions of actuators (8, 9) of the intake (12) and exhaust (13) valves, $VVT_{int}$ and $VVT_{exh}$.

$A_{int}$ and $A_{exh}$ are flow areas of the intake (12) and exhaust (13) valves.

$\theta$ is crank angle (14).

$\theta_{ivo}$ is crank angle (14) at ivo (opening of intake valve (12)), as a function of the position of first actuator (8), $VVT_{int}$.

$\theta_{evc}$ is crank angle (14) at evc (closure of exhaust valve (13)), as a function of the position of second actuator (9), $VVT_{exh}$.

$\theta_{iv} = \theta_{ev}$ is crank angle (14) at which the valves (12; 13) have the same flow area.

Constant of the Burnt Gas Flow Model r is specific ideal gas constant, which is the same for all the gases concerned here (air and exhaust gas), and has the value 288 J/kg/K.

These notations, with index $-^{sp}$, represent the setpoints associated with the quantities considered. The position setpoints of actuators (8 and 9) of the intake (12) and exhaust (13) valves obtained with the method according to the invention are denoted by $\overline{VVT}_{int}$ and $\overline{VVT}_{exh}$, the position setpoints of actuators (8 and 9) of the intake (12) and exhaust (13) valves denoted by $VVT_{int}^{sp}$ and $VVT_{exh}^{sp}$ designate the position setpoints of actuators (8 and 9) to be reached under steady conditions.

Furthermore, what is referred to as transient state is an operation mode of the engine between two steady states of the engine. It is the behavior of the engine upon change from one torque to another, for example when easing off the gas pedal under high load.

Stage 1)—Acquisition of the Torque Setpoint

The method according to the invention allows controlling the burnt gas fraction in the cylinder as a function of the torque setpoint applied to the thermal engine. This torque setpoint has to be selected and it results directly or indirectly from a torque request applied to the thermal engine. It can result from the engine control and depend on the depression of the accelerator pedal of the vehicle and is then the image of the driver's request.

Stage 2)—Determination of Setpoints $\overline{VVT}_{int}$ and $\overline{VVT}_{exh}$ The method according to the invention is based on the determination of the position setpoints of the intake and exhaust valve actuators $\overline{VVT}_{int}$ and $\overline{VVT}_{exh}$ for controlling the IGR, which allows controlling the burnt gas fraction in the cylinder. The method is based on the use of an exhaust gas flow model (MEGB). What is referred to as exhaust gas flow model (MEGB) is a model allowing characterizing the burnt gas flow in the EGR circuit and through the variable timing means. This model relates position setpoints of actuators (8 and 9) of the intake (12) and exhaust (13) valves to engine torque setpoint $T_q^{sp}$. This model can also depend on engine speed $N_e$. It is constructed on the one hand by achieving maps (MAP) (FIGS. 5 to 7) of the engine as a function of the torque setpoint $T_q^{sp}$ of the engine and, on the other hand, with a filling model (MR) of the cylinder, associated with the maps. This model (MEGB) allows the IGR to be controlled during transient states.

Preferably, what is referred to as the filling model (MR), is a static cylinder filling model estimating the intake air mass and the burnt gas mass in the cylinder as a function of engine speed $N_e$, temperature $T_{int}$ and pressure $P_{int}$ in intake manifold (3) and the positions of actuators (8 and 9) $VVT_{int}$ and $VVT_{exh}$. The filling model (MR) allows knowledge of the burnt gas fraction in the cylinder and therefore controlling the EGR and the IGR for burnt gas control in the cylinder under transient conditions. Such a model is for example described in the following document:

T. Leroy, J. Chauvin, F. Le Berr, A. Duparchy and G. Alix, "Modeling Fresh Air Charge and Residual Gas Fraction on a Dual Independant Variable Valve Timing SI Engine", in *Proc. of SAE Conference*, 2008-01-0983, 2008).

Let the air $m_{asp}^{int}$ and burnt gas $m_{asp}^{exh}$ masses be defined as:

$$\begin{cases} m_{asp}^{int} = \alpha_1 \frac{P_{int}}{rT_{int}} V_{ivc} - m_{asp}^{exh} \\ m_{asp}^{exh} = \alpha_2 \frac{OF}{N_e} + \alpha_3 V_{evc} \end{cases}$$

The overlap factor OF is determined by the relation:

$$OF = \int_{\theta_{ivo}}^{\theta_{iv}=\theta_{ev}} A_{int}\, d\theta + \int_{\theta_{iv}=\theta_{ev}}^{\theta_{evc}} A_{exh}\, d\theta$$

Functions f and g defined as follows are then introduced:

$$\begin{cases} f(P_{int}, VVT_{int}, VVT_{exh}) = \alpha_1(P_{int}, N_e)\dfrac{P_{int}}{RT_{int}}V_{ivc}(VVT_{int}) - \\ \quad \alpha_2(P_{int}, N_e)\dfrac{OF(VVT_{int}, VVT_{exh})}{N_e} - \alpha_3(P_{int}, N_e)V_{evc}(VVT_{exh}) \\ g(P_{int}, VVT_{int}, VVT_{exh}) = \alpha_2(P_{int}, N_e)\dfrac{OF(VVT_{int}, VVT_{exh})}{N_e} + \\ \quad \alpha_3(P_{int}, N_e)V_{evc}(VVT_{exh}) \end{cases}$$

For clarity reasons, the engine speed and the intake temperature are removed from the expression. In fact, these two values are measured and their influences are less than the influences of the other members of the equation. The following equations are obtained:

$$\begin{cases} m_{asp}^{int} = f(P_{int}, VVT_{int}, VVT_{exh}) \\ m_{asp}^{exh} = g(P_{int}, VVT_{int}, VVT_{exh}) \end{cases}$$

The burnt gas fraction in the cylinder is equal to the sum of the burnt gas masses defined:

$$X_{cyl} = \frac{X_{int} m_{asp}^{int} + m_{asp}^{exh}}{m_{asp}^{int} + m_{asp}^{exh}}$$

where, in the numerator, the burnt gas mass from the intake $X_{int}m_{asp}^{int}$ (equal to zero when there is no burnt gas coming from the EGR circuit) and the burnt gas mass from the exhaust $m_{asp}^{exh}$ (here, there is only burnt gas, due to the stoichiometric running conditions) are added. Eventually, an estimation of the burnt gas fraction in the cylinder is obtained which is expressed by the following equation:

$$X_{cyl} = \Phi(P_{int}, X_{int}, VVT_{int}, VVT_{exh}) \tag{1}$$

Control of the burnt gas fraction in the cylinder in a way that it is fulfilled also under transient conditions is desired. The first stage of the control method according to the invention is determining the burnt gas fraction in the cylinder for the steady state that is desired.

Figure 2:
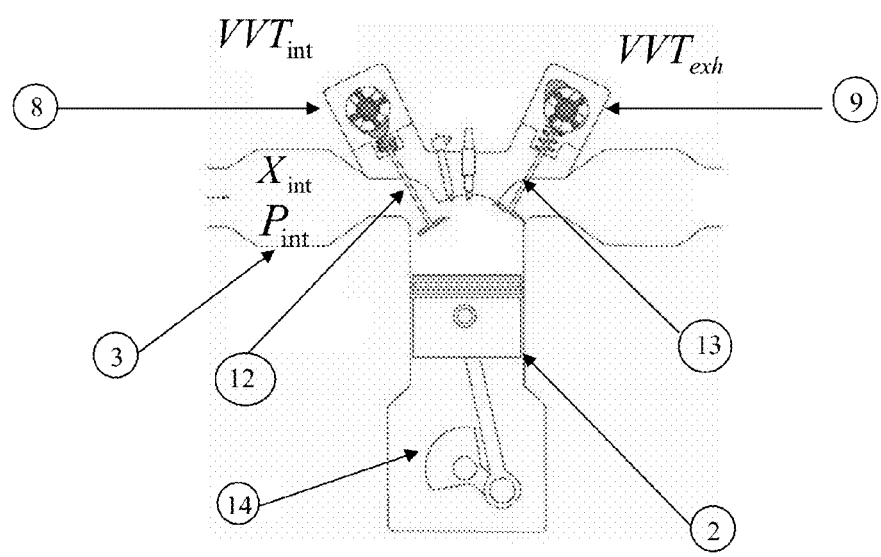
FIG. 2 illustrates a part of the engine of FIG. 1 and shows variables surrounding a cylinder.

FIG. 2 illustrates a cylinder (2) of a thermal engine (1) and the vicinity thereof, by showing the surrounding variables. $X_{int}$ and $P_{int}$ are the values of the burnt gas mass fraction and of the pressure in intake manifold (3). A single intake valve (12) and a single exhaust valve (13) are shown, however, since it is well known, each cylinder can be provided with several valves of either type. Besides, the position of each actuator (8 and 9) of valves (12 and 13) is denoted by $VVT_{int}$ or $VVT_{exh}$.

Figure 3:
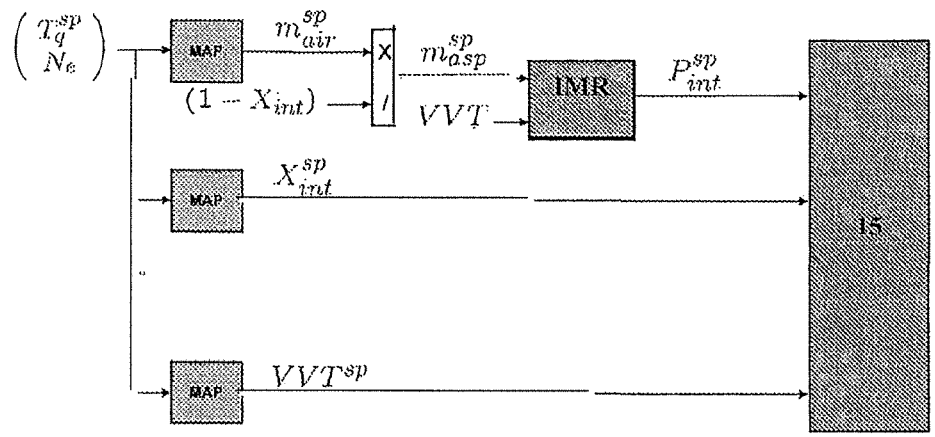
FIG. 3 shows how to determine the air loop setpoints under steady conditions as used in the prior art.
Figure 4:
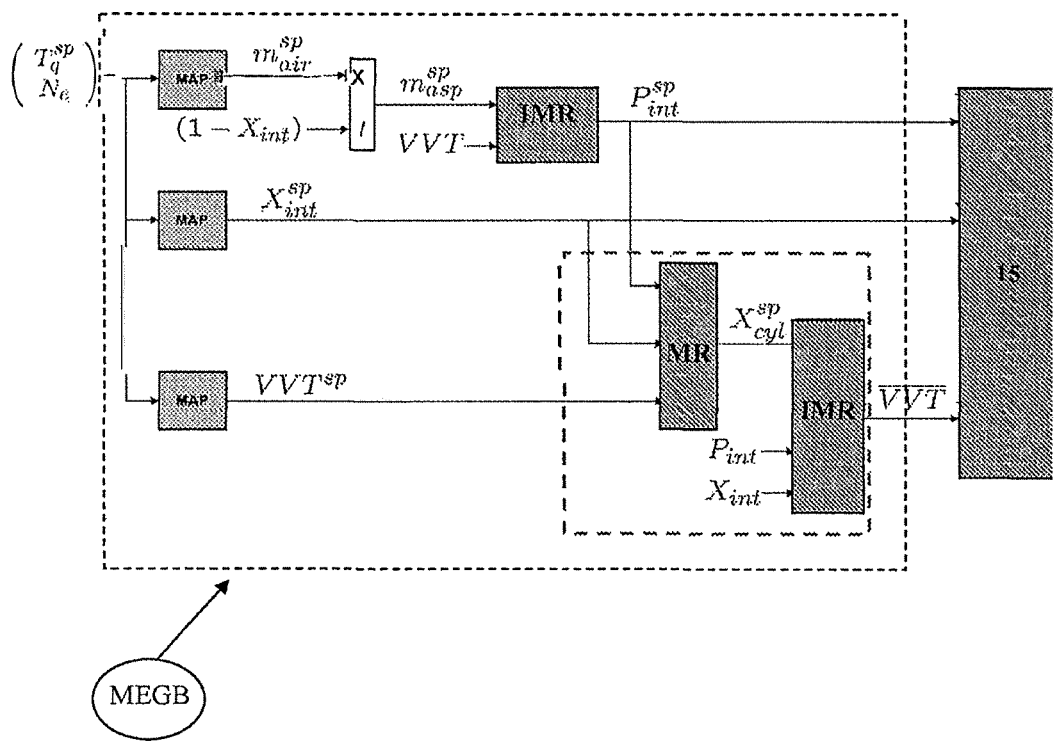
FIG. 4 shows how to determine the air loop setpoints according to the invention.

The method according to the invention as illustrated in FIG. 4 modifies the position setpoint of actuators (8 and 9) of the intake (12) and exhaust (13) valves $VVT_{int}^{sp}$ and $VVT_{exh}^{sp}$ of the steady state (obtained through maps) to compensate for the slowness of the composition at the intake. Therefore, the inverse of model (MR) of Equation (1) is calculated to determine the position required for the intake and exhaust valve actuators (also denoted here by VVT for both intake and exhaust valve actuators):

$$VVT = \Phi(X_{cyl}^{sp}, P_{int}, X_{int})  \quad (2)$$

where $\Phi$ is the inverse function of function $\Phi$ such that:

$$x = \Phi(P_{int}, X_{int}, \Phi(x, P_{int}, X_{int}))$$

where x corresponds to any value of the burnt gas fraction in the cylinder. It is important to note that it is the estimation of the intake composition, $X_{int}$, that is used in Equation (2), and not setpoint $X_{int}^{sp}$. The method thus modifies the setpoint of the fast actuators (8 and 9) of the intake (12) and exhaust (13) valves under transient conditions, $\overline{VVT}_{int}$ and $\overline{VVT}_{exh}$, in relation to FIG. 3 that illustrates the prior art.

According to a preferred embodiment of the invention, the burnt gas flow model is constructed by carrying out the following:

a) determining setpoints relative to the pressure in the intake manifold $P_{int}^{sp}$, the burnt gas fraction in the intake manifold $X_{int}^{sp}$ and the position of the variable timing means $VVT_{int}^{sp}$ and $VVT_{exh}^{sp}$ desired in the steady state;

b) determining a setpoint for the burnt gas fraction in the cylinder $X_{cyl}^{sp}$ by applying the cylinder filling model (MR) from the intake pressure setpoint $P_{int}^{sp}$, the burnt gas fraction setpoint in intake manifold (3) $X_{int}^{sp}$ and position setpoints for the actuators (8 and 9) of the intake (12) and exhaust (13) valves $VVT_{int}^{sp}$ and $VVT_{exh}^{sp}$ desired in the steady state; and c) determining the position setpoints for the actuators (8 and 9) of the intake (12) and exhaust (13) valves $\overline{VVT}_{int}$ and $\overline{VVT}_{exh}$ by inverting the cylinder filling model (MR) from the estimated burnt gas fraction in intake manifold (3) $X_{int}$, the burnt gas fraction setpoint in cylinder (2) $X_{cyl}^{sp}$ and the pressure measured in intake manifold (3) $P_{int}$.

Thus, the position setpoints for the actuators (8 and 9) of the intake (12) and exhaust (13) valves $\overline{VVT}_{int}$ and $\overline{VVT}_{exh}$ are obtained first by applying a filling model (MR), then by applying the inverted filling model (IMR). It should be noted that the inverted filling model (IMR) does not depend on setpoint values $P_{int}^{sp}$ and $X_{int}^{sp}$ but instead on estimated and/or measured values of these values, $P_{int}$ and $X_{int}$. Using this filling model (MR) allows determination of the setpoint for the burnt gas mass fraction in the cylinder $X_{cyl}^{sp}$, which makes optimum IGR control possible. Moreover, the combination of the filling model (MR) and of its inverse (IMR) allows convergence of the position setpoints of the actuators (8 and 9) of the intake (12) and exhaust (13) valves $\overline{VVT}_{int}$ and $\overline{VVT}_{exh}$ to the position setpoints of the actuators (8 and 9) of the intake (12) and exhaust (13) valves $VVT_{int}^{sp}$ and $VVT_{exh}^{sp}$ desired in the steady state. At the end of the transient state, the relationship is:

$$\overline{VVT}_{int} = VVT_{int}^{sp}$$

$$\overline{VVT}_{exh} = VVT_{exh}^{sp}$$

In fact, at the end of the transient state, the pressure in the intake manifold $P_{int}$ reaches its setpoint value $P_{int}^{sp}$. Similarly, the burnt gas fraction in the intake manifold $X_{int}$ reaches its setpoint value $X_{int}^{sp}$. The model and its inverse then have the same values.

Figure 5:
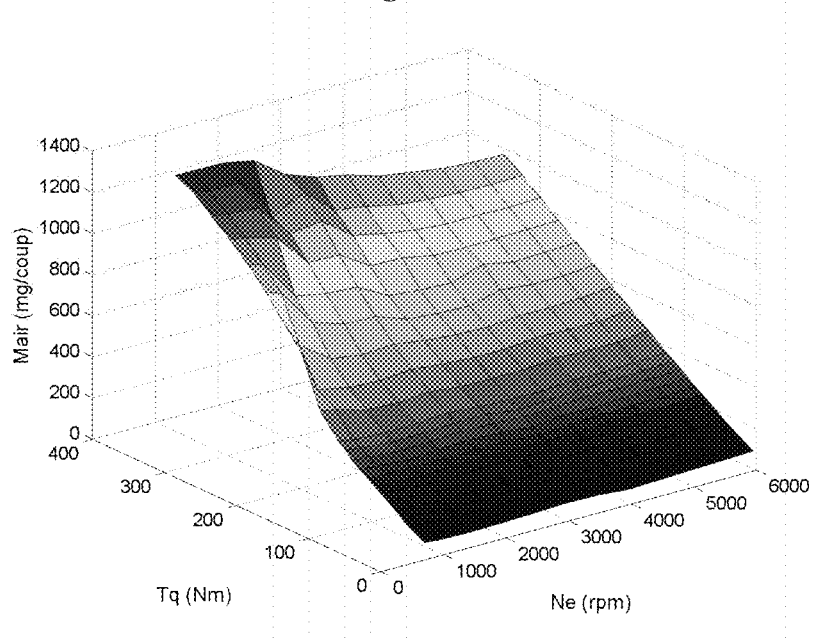
FIG. 5 illustrates an air mass setpoint map.
Figure 6:
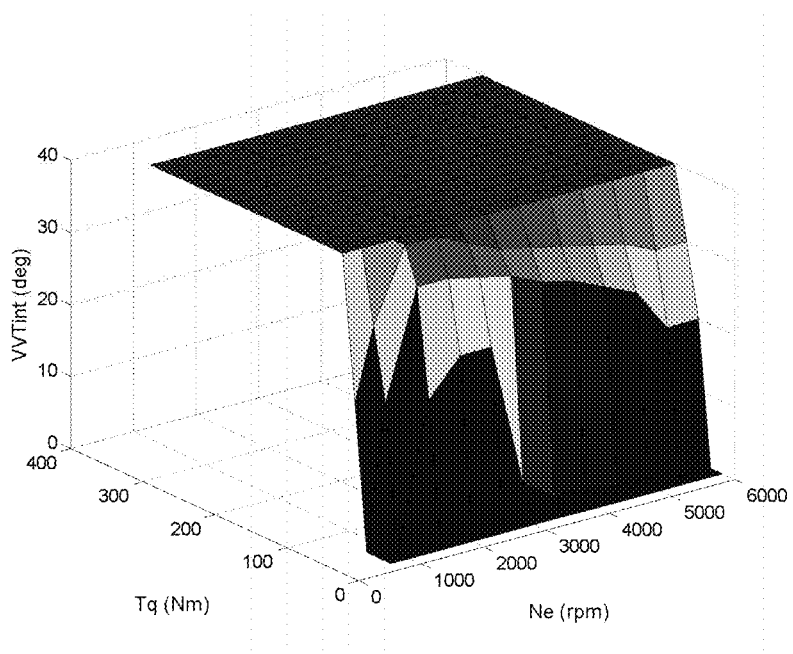
FIG. 6 illustrates a setpoint map for the position of the first actuator (0 corresponds to an intake opening lead with overlap AOA=−10°, and 40 to AOA=30°.
Figure 7:
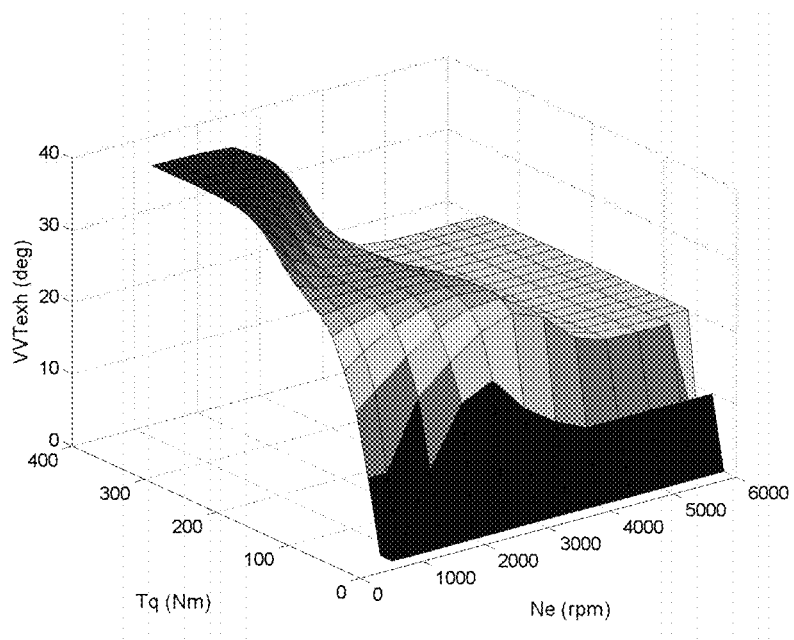
FIG. 7 illustrates a setpoint map for the position of the second actuator with 0 corresponding to an exhaust closure delay RFE=−29°, 40 to RFE=11°.

Conventionally, determination of the setpoints relative to the pressure in the intake manifold $P_{int}^{sp}$, the burnt gas fraction in the intake manifold $X_{int}^{sp}$ and the position of the variable timing means $VVT_{int}^{sp}$ and $VVT_{exh}^{sp}$ desired in the steady state, as described in stage a) above, is achieved by carrying out the following stages:

i) determining an air mass setpoint in the cylinder $m_{air}^{sp}$, a burnt gas fraction setpoint in the intake manifold $X_{int}^{sp}$ and position setpoints for the intake and exhaust valve actuators $VVT_{int}^{sp}$ and $VVT_{exh}^{sp}$ desired in the steady state from maps (MAP) of the engine, as illustrated in FIGS. 5 to 7 wherein the maps (MAP) depend on the engine speed $N_e$ and on the engine torque setpoint $T_q^{sp}$;

ii) determining an intake air mass setpoint in the cylinder $m_{asp}^{sp}$ from the estimation of the burnt gas fraction in the intake manifold $X_{int}$ and of the air mass in the cylinder $m_{air}^{sp}$ by a method of estimating or a method of measuring the burnt gas fraction in the intake manifold (3); and iii) determining an intake pressure setpoint $P_{int}^{sp}$ from the inverted cylinder (2) filling model (IMR) from the intake air mass setpoint in the cylinder $m_{asp}^{sp}$ and the estimated positions of the intake and exhaust valve actuators (8 and 9) $VVT_{int}$ and $VVT_{exh}$.

Advantageously, determination of the position setpoints of the actuators (8 and 9) of the intake (12) and exhaust (13) valves $\overline{VVT}_{int}$ and $\overline{VVT}_{exh}$ of stage c) described above is obtained by carrying out the following stages:

i) setting the position of second actuator (9) $VVT_{exh}$ to its setpoint value $VVT_{exh}^{sp}$ in the steady state;

ii) determining the position setpoint of first actuator (8) $\overline{VVT}_{int}$ from the position setpoint of second actuator (9) $VVT_{exh}$ by applying an inverted cylinder filling model defined by:

$$\overline{VVT}_{int} = \Phi(X_{cyl}^{sp}, P_{int}, X_{int}, VVT_{exh}^{sp});$$

and iii) determining the position setpoint of second actuator (9) $\overline{VVT}_{exh}$ such that:

if the position setpoint of first actuator (8) $\overline{VVT}_{int}$ enters saturation, a value is determined from the position of the first actuator (8) $\overline{VVT}_{int}$ using the inverted cylinder filling model defined as:

$$\overline{VVT}_{exh} = \Phi(X_{cyl}^{sp}, P_{int}, X_{int}, \overline{VVT}_{int});$$

otherwise, the value is determined as its setpoint value $VVT_{exh}^{sp}$ in the steady state wherein: $\overline{VVT}_{exh} = VVT_{exh}^{sp}$.

In stages i) to iii) described above, the intake and exhaust quantities can be inverted. It is possible to first set $VVT_{int}$ and then to calculate $\overline{VVT}_{exh}$ and to determine $\overline{VVT}_{int}$.

The saturation of the position setpoint of first actuator (8) $\overline{VVT}_{int}$ is defined by the mechanical constraints linked with the actuator which are minimum and maximum phase shifts allowable by the actuator.

Stage 3)—Control of the Burnt Gas Fraction

The burnt gas fraction in the cylinder $X_{cyl}$ is then controlled through the control of actuators (8 and 9) of the intake (12) and exhaust (13) valves at their setpoint values $\overline{VVT}_{int}$ and $\overline{VVT}_{exh}$. The proportion of burnt gas in the cylinder is thus optimized for the transient states by controlling the IGR, whose response is faster but also in the steady state. Indeed, once the steady state reached, the position setpoints of actuators (8 and 9) of the intake (12) and exhaust (13) valves $\overline{VVT}_{int}$ and $\overline{VVT}_{exh}$ tend to the values given by the engine maps (MAP).

The control method according to the invention thus allows:
controlling the composition of the gas in the cylinder of a gasoline engine equipped with an EGR system and with WT type (Variable Valve Timing) means;
accounting for the estimation of the composition of the gas at the intake to improve the burnt gas fraction transient response; and improving the burnt gas fraction transient response, which results in enhanced driveability. The gas composition slowness at the intake (due to the length of the EGR circuit) is compensated by the modification of the position setpoint of the valve actuators in order to meet the burnt gas fraction request.

Furthermore, the invention relates to an internal-combustion engine (1) comprising at least one cylinder (2), at least one intake valve (12) in the cylinder and at least one exhaust valve (13) for burnt gas discharge from the cylinder (2). The combustion engine is provided with a burnt gas recirculation circuit and with variable timing means. The variable timing means has a first actuator (8) of at least one intake valve (12) and of a second actuator (9) of at least one exhaust valve (13). The engine (1) comprises means of controlling the engine for application of the control method according to the invention.

The invention claimed is:

1. A method of controlling an internal-combustion engine comprising at least one cylinder, at least one intake valve in the at least one cylinder and at least one exhaust valve for discharging burnt gas from the at least one cylinder, an external exhaust gas recirculation circuit and a variable timing means, including a first actuator of the at least one intake valve and a second actuator of the at least one exhaust valve comprising:
   acquiring a torque setpoint for the engine;
   determining a position setpoint for the first actuator and a position setpoint for the second actuator by using a burnt gas flow model which relates position setpoints of the actuators to the engine torque setpoint and includes a cylinder filling model, the burnt gas flow model characterizing burnt gas flow in the external exhaust gas recirculation circuit and through the variable timing means; and
   controlling a burnt gas fraction in the at least one cylinder by controlling the first and second actuators respectively with the position setpoints; and wherein the burnt gas flow model is constructed using engine maps as a function of the engine torque setpoint associated with the filling model of the at least one cylinder by
   a) determining setpoints relative to pressure in the burnt gas fraction in the intake manifold and a position of the variable timing means and desired at steady state as a function of the engine torque setpoint;
   b) determining a setpoint for the burnt gas fraction in the at least one cylinder by applying the cylinder filling model from the intake pressure setpoint the burnt gas fraction setpoint in the intake manifold and position setpoints for the first and second actuators at the steady state; and
   c) determining setpoints for the actuators at transient states by inverting the cylinder filling model from an estimated burnt gas fraction in the intake manifold, a burnt gas fraction setpoint in the at least one cylinder and an estimated pressure in the intake manifold.

2. A method as claimed in claim 1, wherein the filling model is a static cylinder filling model estimating an intake air mass and a burnt gas mass in the cylinder as a function of engine speed, temperature and pressure in an intake manifold of the internal-combustion engine and positions and of the actuators.

3. A method as claimed in claim 2, wherein the burnt gas flow model is constructed using engine maps as a function of the torque setpoint of the engine associated with the filling model of the at least one cylinder.

4. A method as claimed in claim 1, wherein:
the filling model of the at least one cylinder is defined as:

$$X_{cyl} = \Phi(P_{int}, X_{int}, VVT_{int}, VVT_{exh})$$

with:
$X_{cyl}$ being a burnt gas mass fraction in cylinder;
$P_{int}$ being pressure in an intake manifold, integrated in the engine upstream from the at least one cylinder, with a mixture of air and burnt gas being withdrawn for an intake;
$X_{int}$ being a burnt gas mass fraction in the intake manifold;
$VVT_{int}$ being a position of the first actuator; and
$VVT_{exh}$ is a position of the second actuator; and
$\Phi$ is a function.

5. A method as claimed in claim 2, wherein:
the filling model of the at least one cylinder is defined as:

$$X_{cyl} = \Phi(P_{int}, X_{int}, VVT_{int}, VVT_{exh})$$

with:
$X_{cyl}$ being a burnt gas mass fraction in cylinder;
$P_{int}$ being pressure in an intake manifold, integrated in the engine upstream from the at least one cylinder, with a mixture of air and burnt gas being withdrawn for an intake;
$X_{int}$ being a burnt gas mass fraction in the intake manifold;
$VVT_{int}$ being a position of the first actuator; and
$VVT_{exh}$ is a position of the second actuator; and
$\Phi$ is a function.

6. A method as claimed in claim 3, wherein:
the filling model of the at least one cylinder is defined as:

$$X_{cyl} = \Phi(P_{int}, X_{int}, VVT_{int}, VVT_{exh})$$

with:
$X_{cyl}$ being a burnt gas mass fraction in cylinder;
$P_{int}$ being pressure in an intake manifold, integrated in the engine upstream from the at least one cylinder, with a mixture of air and burnt gas being withdrawn for an intake;
$X_{int}$ being a burnt gas mass fraction in the intake manifold;
$VVT_{int}$ being a position of the first actuator; and
$VVT_{exh}$ is a position of the second actuator; and
$\Phi$ is a function.

7. A method as claimed in claim 4, wherein the filling model is obtained from equations:

$$\begin{cases} m_{asp}^{int} = f(P_{int}, VVT_{int}, VVT_{exh}) \\ m_{asp}^{exh} = g(P_{int}, VVT_{int}, VVT_{exh}) \end{cases}$$

wherein:

$$\begin{cases} f(P_{int}, VVT_{int}, VVT_{exh}) = \alpha_1(P_{int}, N_e) \frac{P_{int}}{RT_{int}} V_{ivc}(VVT_{int}) - \\ \alpha_2(P_{int}, N_e) \frac{OF(VVT_{int}, VVT_{exh})}{N_e} - \alpha_3(P_{int}, N_e) V_{evc}(VVT_{exh}) \\ g(P_{int}, VVT_{int}, VVT_{exh}) = \alpha_2(P_{int}, N_e) \frac{OF(VVT_{int}, VVT_{exh})}{N_e} + \\ \alpha_3(P_{int}, N_e) V_{evc}(VVT_{exh}) \end{cases}$$

and from another equation:

$$X_{cyl} = \frac{X_{int}m_{asp}^{int} + m_{asp}^{exh}}{m_{asp}^{int} + m_{asp}^{exh}}$$

with:
$X_{cyl}$ being a burnt gas mass fraction in the at least one cylinder;
$P_{int}$ being a pressure in an intake manifold;
$X_{int}$ being a burnt gas mass fraction in the intake manifold;
$m_{asp}^{int}$ being an intake mass into the at least one cylinder through intake valves;
$m_{asp}^{exh}$ being an intake mass from internal burnt gas recirculation;
$\alpha_1, \alpha_2$ and $\alpha_3$ being known filling model calibration parameters as a function of $P_{int}$ and $N_e$;
$V_{ivc}$ being cylinder volume of the at least one cylinder at intake valve closure as a function of the position of actuator of at least one intake valve $VVT_{int}$;
$V_{evc}$ is volume of the at least one cylinder of exhaust valve closure as a function of the position of second actuator $VVT_{exh}$; and
OF is an overlap factor as a function of the positions of actuators of the at least one intake and the at least one exhaust valves $VVT_{int}$ and $VVT_{exh}$.

8. A method as claimed in claim 5, wherein the filling model is obtained from equations:

$$\begin{cases} m_{asp}^{int} = f(P_{int}, VVT_{int}, VVT_{exh}) \\ m_{asp}^{exh} = g(P_{int}, VVT_{int}, VVT_{exh}) \end{cases}$$

wherein:

$$\begin{cases} f(P_{int}, VVT_{int}, VVT_{exh}) = \alpha_1(P_{int}, N_e)\frac{P_{int}}{RT_{int}}V_{ivc}(VVT_{int}) - \\ \alpha_2(P_{int}, N_e)\frac{OF(VVT_{int}, VVT_{exh})}{N_e} - \alpha_3(P_{int}, N_e)V_{evc}(VVT_{exh}) \\ g(P_{int}, VVT_{int}, VVT_{exh}) = \alpha_2(P_{int}, N_e)\frac{OF(VVT_{int}, VVT_{exh})}{N_e} + \\ \alpha_3(P_{int}, N_e)V_{evc}(VVT_{exh}) \end{cases}$$

and from another equation:

$$X_{cyl} = \frac{X_{int}m_{asp}^{int} + m_{asp}^{exh}}{m_{asp}^{int} + m_{asp}^{exh}}$$

with:
$X_{cyl}$ being a burnt gas mass fraction in the at least one cylinder;
$P_{int}$ being a pressure in an intake manifold;
$X_{int}$ being a burnt gas mass fraction in the intake manifold;
$m_{asp}^{int}$ being an intake mass into the at least one cylinder through intake valves;
$m_{asp}^{exh}$ being an intake mass from internal burnt gas recirculation;
$\alpha_1, \alpha_2$ and $\alpha_3$ being known filling model calibration parameters as a function of $P_{int}$ and $N_e$;
$V_{ivc}$ being cylinder volume of the at least one cylinder at intake valve closure as a function of the position of actuator of at least one intake valve $VVT_{int}$;
$V_{evc}$ is volume of the at least one cylinder of exhaust valve closure as a function of the position of second actuator $VVT_{exh}$; and
OF is an overlap factor as a function of the positions of actuators of the at least one intake and the at least one exhaust valves $VVT_{int}$ and $VVT_{exh}$.

9. A method as claimed in claim 6, wherein the filling model is obtained from equations:

$$\begin{cases} m_{asp}^{int} = f(P_{int}, VVT_{int}, VVT_{exh}) \\ m_{asp}^{exh} = g(P_{int}, VVT_{int}, VVT_{exh}) \end{cases}$$

wherein:

$$\begin{cases} f(P_{int}, VVT_{int}, VVT_{exh}) = \alpha_1(P_{int}, N_e)\frac{P_{int}}{RT_{int}}V_{ivc}(VVT_{int}) - \\ \alpha_2(P_{int}, N_e)\frac{OF(VVT_{int}, VVT_{exh})}{N_e} - \alpha_3(P_{int}, N_e)V_{evc}(VVT_{exh}) \\ g(P_{int}, VVT_{int}, VVT_{exh}) = \alpha_2(P_{int}, N_e)\frac{OF(VVT_{int}, VVT_{exh})}{N_e} + \\ \alpha_3(P_{int}, N_e)V_{evc}(VVT_{exh}) \end{cases}$$

and from another equation:

$$X_{cyl} = \frac{X_{int}m_{asp}^{int} + m_{asp}^{exh}}{m_{asp}^{int} + m_{asp}^{exh}}$$

with:
$X_{cyl}$ being a burnt gas mass fraction in the at least one cylinder;
$P_{int}$ being a pressure in an intake manifold;
$X_{int}$ being a burnt gas mass fraction in the intake manifold;
$m_{asp}^{int}$ being an intake mass into the at least one cylinder through intake valves;
$m_{asp}^{exh}$ being an intake mass from internal burnt gas recirculation;
$\alpha_1, \alpha_2$ and $\alpha_3$ being known filling model calibration parameters as a function of $P_{int}$ and $N_e$;
$V_{ivc}$ being cylinder volume of the at least one cylinder at intake valve closure as a function of the position of actuator of at least one intake valve $VVT_{int}$;
$V_{evc}$ is volume of the at least one cylinder of exhaust valve closure as a function of the position of second actuator $VVT_{exh}$; and
OF is an overlap factor as a function of the positions of actuators of the at least one intake and the at least one exhaust valves $VVT_{int}$ and $VVT_{exh}$.

10. A method as claimed in claim 1, wherein:
setpoints relative to pressure in the intake manifold, a burnt gas fraction in the intake manifold and a position of the variable timing means desired for steady state are obtained by:
i) determining an air mass setpoint in the at least one cylinder, a burnt gas fraction setpoint in the intake manifold and position setpoints for the at least one intake and the at least one exhaust valve actuator desired for the steady state from maps of the engine which depend on the engine speed and on the engine torque setpoint;
ii) determining an intake air mass setpoint in the at least one cylinder from estimation of a burnt gas fraction in the intake manifold and of an air mass in the at least one cylinder by a method of estimating or a method of measuring the burnt gas fraction in the intake manifold; and iii) determining an intake pressure setpoint from the inverted cylinder filling model IMR from an intake air mass setpoint in the at least one cylinder and the estimated positions of the actuators of the at least one intake and the at least one exhaust valves.

11. A method as claimed in claim 1, wherein determination of the position setpoints of the actuators $\overline{VVT}_{int}$ and $\overline{VVT}_{exh}$ are obtained by:

i) setting a position of second actuator $VVT_{exh}$ to setpoint value $VVT_{exh}^{sp}$ in the steady state;

ii) determining a position setpoint of first actuator $\overline{VVT}_{int}$ from the position setpoint of second actuator $VVT_{exh}$ by applying an inverted cylinder filling model of internal burnt gas recirculation defined by the equation:

$$\overline{VVT}_{int} = \Phi(X_{cyl}^{sp}, P_{int}, X_{int}, VVT_{exh}^{sp})$$

iii) determining a position setpoint of the second actuator $\overline{VVT}_{exh}$ so that if the position setpoint of the first actuator $\overline{VVT}_{int}$ enters saturation, a position setpoint of the second actuator is determined from a position of the first actuator $\overline{VVT}^{int}$ using an inverted cylinder filling model of internal burnt gas recirculation defined by the equation:

$$\overline{VVT}_{exh} = \Phi(X_{cyl}^{sp}, P_{int}, X_{int}, \overline{VVT}_{int});$$

and determining position of a second actuator at a setpoint value $\overline{VVT}_{exh}^{sp}$ in the steady state wherein $\overline{VVT}_{exh} = VVT_{exh}^{sp}$.

12. A method as claimed in claim 10, wherein determination of the position setpoints of the actuators $\overline{VVT}_{int}$ and $\overline{VVT}_{exh}$ are obtained by:

i) setting a position of second actuator $VVT_{exh}$ to setpoint value $VVT_{exh}^{sp}$ in the steady state;

ii) determining a position setpoint of first actuator $\overline{VVT}_{int}$ from the position setpoint of second actuator $VVT_{exh}$ by applying an inverted cylinder filling model of internal burnt gas recirculation defined by the equation:

$$\overline{VVT}_{int} = \Phi(X_{cyl}^{sp}, P_{int}, X_{int}, VVT_{exh}^{sp})$$

iii) determining a position setpoint of the second actuator $\overline{VVT}_{exh}$ so that if the position setpoint of the first actuator $\overline{VVT}_{int}$ enters saturation, a position setpoint of the second actuator is determined from a position of the first actuator $\overline{VVT}_{int}$ using an inverted cylinder filling model of internal burnt gas recirculation defined by the equation:

$$\overline{VVT}_{exh} = \Phi(X_{cyl}^{sp}, P_{int}, X_{int}, \overline{VVT}_{int});$$

and determining position of a second actuator at a setpoint value $\overline{VVT}_{exh}^{sp}$ in the steady state wherein $\overline{VVT}_{exh} = VVT_{exh}^{sp}$.

\* \* \* \* \*